United States Patent
Bartholomew

(10) Patent No.: US 11,181,480 B2
(45) Date of Patent: Nov. 23, 2021

(54) RAMAN SPECTROSCOPY FOR MINERALS IDENTIFICATION

(71) Applicant: Paul Bartholomew, Hamden, CT (US)

(72) Inventor: Paul Bartholomew, Hamden, CT (US)

(*) Notice: Subject to any disclaimer, the term of this patent is extended or adjusted under 35 U.S.C. 154(b) by 0 days.

(21) Appl. No.: 17/068,434

(22) Filed: Oct. 12, 2020

(65) Prior Publication Data

US 2021/0148827 A1 May 20, 2021

Related U.S. Application Data

(60) Division of application No. 16/542,900, filed on Aug. 16, 2019, now Pat. No. 10,801,963, which is a continuation-in-part of application No. 16/108,474, filed on Aug. 22, 2018, now Pat. No. 10,663,345.

(51) Int. Cl.
*G01J 3/44* (2006.01)
*G01N 21/65* (2006.01)
*G01N 21/01* (2006.01)

(52) U.S. Cl.
CPC ............ *G01N 21/65* (2013.01); *G01N 21/01* (2013.01); *G01N 2201/129* (2013.01); *G01N 2201/13* (2013.01)

(58) Field of Classification Search
CPC ................ G01N 21/65; G01N 21/658; G01N 2021/656; G01J 3/44; G01J 3/02
USPC ......................................................... 356/301
See application file for complete search history.

(56) References Cited

U.S. PATENT DOCUMENTS

| | | |
|---|---|---|
| 6,393,906 B1 | 5/2002 | Vityk et al. |
| 6,995,839 B1 | 2/2006 | Shapiro |
| 7,610,080 B1 | 10/2009 | Winchester, Jr. et al. |
| 7,636,157 B2 | 12/2009 | Wang et al. |
| 7,701,571 B2 | 4/2010 | Azimi et al. |
| 7,902,545 B2 | 3/2011 | Csutak |
| 8,982,338 B2 | 3/2015 | Hamilton et al. |
| 9,001,320 B2 | 4/2015 | Harel et al. |
| 9,075,015 B2 | 7/2015 | Shapiro |
| 9,316,540 B1 | 4/2016 | Phua |
| 9,417,332 B2 | 8/2016 | Bouton et al. |
| 2001/0036304 A1 | 11/2001 | Yang et al. |
| 2003/0123057 A1 | 7/2003 | Lemmo et al. |
| 2003/0142302 A1 | 7/2003 | Jiang |
| 2008/0239306 A1 | 10/2008 | Sutherland et al. |
| 2011/0292376 A1 | 12/2011 | Kukushkin et al. |

(Continued)

FOREIGN PATENT DOCUMENTS

CN 1140792 C 3/2004

OTHER PUBLICATIONS

International Search Report and The Written Opinion of the International Searching Authority dated Feb. 22, 2021.

(Continued)

*Primary Examiner* — Md M Rahman
(74) *Attorney, Agent, or Firm* — St Onge Steward Johnston and Reens LLC

(57) ABSTRACT

A method for identifying minerals and other materials illuminates a mineral with monochromatic light for an illumination duration and a true Raman spectrum is determined. The true Raman spectrum data is compared to reference spectrums to identify the mineral or material by calculating an identification score for each reference Raman spectrum relative to the Raman spectrum data of the unknown material using a formula that includes both a coincident-peak term and a missing-peak-penalty term.

13 Claims, 5 Drawing Sheets

(56) References Cited

U.S. PATENT DOCUMENTS

| | | |
|---|---|---|
| 2013/0321792 A1 | 12/2013 | Shapiro |
| 2013/0321793 A1 | 12/2013 | Hamilton et al. |
| 2015/0090443 A1 | 4/2015 | Bryndzia et al. |
| 2015/0335248 A1 | 11/2015 | Huang et al. |
| 2019/0103258 A1 | 4/2019 | Richardson et al. |

OTHER PUBLICATIONS

Bartholomew, P.R. (2013) Comparing the success rate of Raman spectroscopy and powder XRD for routine mineral identification. Geostandards and Geoanalytical Research, 37, 353-359.

Jehlickaa,J; Culkaa, A; Vandenabeeleb, P; Edwards, H. (2011) Critical evaluation of a handheld Raman spectrometer with near infrared (785 nm) excitation for field identification of minerals—Spectrochimica Acta Part A 80 (2011) 36-40.

McRae, C.M. and Wilson, N.C. (2008) Luminescence database I—Minerals and materials. Microscopy and Microanalysis, 14, 184-204.

Carey, C., Boucher, T., Mahadevan, S., Dyar, M.D., and Bartholomew, P.R. (2015) Machine learning tools for mineral recognition and classification from Raman spectroscopy. Journal of Raman Spectroscopy, 46, 894-903.

Frost, R., Kloprogge, T., and Schmidt, J. (1999) Non-destructive identification of minerals by Raman microscopy. The Internet Journal of Vibrational Spectroscopy [www.ijvs.com], 3, 4, 2.

Giffith, W. P. (1969). Raman spectroscopy of minerals. Nature, 224, 264.

Bozlee BJ, et al., Remote Raman and fluorescence studies of mineral samples, Spectrochim Acta A Mol Biomol Spectrosc. Aug. 2005;61(10):2342-8.

Mooney, P.R., Dembowski, R.F., Laetsch, T.A., Zwick, Justin, Downs, Robert T., and Lu, Ren (2005) RRUFF Project: Developing an integrated database of Raman and infrared spectra, x-ray diffraction and chemistry data for minerals. Abstracts with Programs, Geological Society of America, 37, 286.

Shiv K. Sharma, et al., Stand-Off Raman spectroscopic detection of minerals on planetary surfaces, Spectrochimica Acta Part A 59 (2003) 2391-2407.

Bartholomew, P.R., Dyar, M.D., and Brady, J.B. (2015) The role of intensity and instrument sensitivity in Raman mineral identification. Journal of Raman Spectroscopy, 46, 889-893.

RAMAN SPECTROSCOPY FOR MINERALS IDENTIFICATION

FIELD OF THE INVENTION

The present invention relates to the field of Raman Spectroscopy, and more particularly, to apparatus and software for identifying unknown minerals. While the invention is designed to be optimized for mineral identification, some components are anticipated to be advantageous for many other applications of Raman spectroscopy as well.

BACKGROUND OF THE INVENTION

Mineral identification is essential to most geoscience investigations including research (field and experimental), industrial, and regulatory investigations in the fields of mineralogy, petrology, geochemistry, geochronology, petroleum exploration, mineral exploration, mining geology, gemology, mineral processing, building materials, environmental health, medical mineralogy, forensic mineralogy, planetary geology, and more. Meeting the needs of all of these industries and applications requires analytical technology that is dependable, accurate, capable of handling a wide range of physical requirements (sample size, sample format, sample location), accessible to users having a wide variety of training, and, ideally, affordable.

Routine mineral identification ("RMI") can be defined as an analytical process that provides for identification of a mineral sample with a low level of sample and/or instrument preparation for each analysis, with relatively quick results, and with a high level of dependability (repeatability and probability of accurate results). However, when an analytical process is highly expensive, requires high amounts of physical space and/or physical support, requires high levels of maintenance and calibration, and/or requires a high level of education and training to operate, it is also impractical—it cannot be widely deployed to or readily available to a high percentage of those individuals/institutions who routinely need analytical results. As such practical RMI ("PRMI") can be defined as an RMI system that requires moderate to low amounts of user training, cost, space, and maintenance.

While individuals with sufficient training and experience may be able to identify many minerals with a few hand tools, there is a widespread need for more analytical and automated means of routine mineral identification. The next level of technology traditionally employed is polarized light microscopy, however, this requires considerable sample preparation and continues to require considerable training and experience. Since the middle of the 20th century the primary technological tool employed for RMI has been powder X-ray diffraction ("PXRD"). Modern improvements have reduced the physical size and cost of PXRD instrumentation and computers have provided for considerable automation of the analytical process, but its application generally requires extraction and powdering of the mineral sample. This type and amount of sample preparation means that PXRD requires a sample-preparation delay before each analysis and is extremely difficult-to-impossible to apply to small mineral grains or mineral grains in situ (without extraction). Additionally, despite the reduction in instrument size that has been achieved for PXRD, it continues to be impractical to attempt to employ PXRD out into a field investigation environment.

In contrast to PXRD, Raman spectroscopy can be employed with little to no sample preparation, in situ, and on physical scales down to the micron level. Raman instruments also typically require relatively little space and both field portable and hand-held units are available. However, a general lack of optimization of the Raman technology for application to minerals (and man-made crystalline solids as well) has prevented widespread adoption of Raman technology for RMI.

The Raman Effect produces a change (shift) in the wavelength of light scattered by a substance. This shift is the result of light interacting with the quantized energy levels of molecular vibrations—as such the magnitude of this wavelength shift and the intensity of Raman scattering are directly related to the mass of the atoms, the nature of bonding forces between neighboring atoms, and the geometric (symmetry) relationships between neighboring bonds. In other words, the spectral position and intensity of the peaks in Raman spectroscopy result from the structure and chemistry of the subject substance. Unlike many other spectroscopy techniques, however, the response from the atoms/molecules is not at specific characteristic wavelength but is rather at a specific shift (spectral distance) from the wavelength of the excitation source—generally a laser. As a result Raman instruments using excitation lasers at different wavelengths will produce the same pattern of Raman shifts from the same substance.

Some additional aspects of the interaction of light with matter become important when attempting to achieve dependable results from Raman systems: (1) The Raman Effect is actually a very low probability interaction—much of the incident light is elastically scattered (without a change in wavelength). (2) Although the pattern of Raman shifts from a particular target substance is independent of the wavelength of the excitation laser, the intensity of the Raman peaks are not. The probability and, therefore, the intensity of Raman scattering increases steadily as the wavelength of the excitation source decreases. (3) Some of the energy of the incident light is absorbed and converted to thermal energy. Depending on the amount absorbed by any specific target substance and its thermal conductivity and thermal stability, the target substance may be modified or even destroyed by the Raman laser. (4) Last, but far from least, for many substances some of the absorbed light energy is re-emitted as longer-wavelength light—an effect referred to as fluorescence or photoluminescence. When a target substance responds to the Raman laser with fluorescent light its intensity tends to be stronger than Raman scattered light, often orders of magnitude stronger. Unlike the Raman Effect, however, the intensity of fluorescence, even whether it occurs at all, does depend upon the wavelength of the excitation light source.

The basic components of a Raman spectrometer system are as follows: (1) a laser as the excitation light source since the need to measure wavelength shifts and the low probability of the Raman Effect leads to a need for a high intensity monochromatic excitation source; (2) optical components to focus the laser beam onto the sample; (3) optical components to direct the light scattered/emitted from the sample towards a spectrograph; (4) a long-pass or notch filter positioned between the sample and the spectrograph to separate the wavelength-shifted light from elastically scatted light at the incident wavelength; and (5) a spectrograph typically employing a diffraction grating and a solid-state array detector.

For standardized sample holders without spatial specificity like liquids in a cuvette, mechanical sample positioning is sufficient. When spatially specific sample positioning is required some kind of optical pointing system is required—often this is a microscope with the laser source coaxially introduced with partially reflecting mirrors. Finally, for reasons ranging from physical convenience to a practical need to separate the spectrometer from the sample, many Raman spectrometers employ a fiber-optic bundle with the laser source being delivered through a central fiber and scattered light being carried back to the spectrometer through the remaining fibers in the bundle. In general, again due to the weakness of the Raman Effect, the sample must be isolated from any ambient light.

The performance challenges of Raman technology often intersect or even compete with one another resulting in performance trade-offs. The central performance challenges are the minimum Raman shift, spectral resolution, spectral range, signal sensitivity, and reducing/avoiding fluorescence interference.

The minimum Raman shift is determined by the type and quality of the cutoff filter. This performance parameter is only critical when the Raman spectrum of the materials being studied has important or critical peaks in the low Raman shift region (e.g., less than 300 $cm^{-1}$).

The technology required to increase spectral range generally reduces resolution. This trade-off can be reduced by increasing the physical size of the spectrograph and/or increasing the pixel width of the array detector.

Signal sensitivity refers to the proportion of the signal response light from the sample that reaches and is recorded by the detector. Again, there are technical trade-offs between sensitivity and other performance factors. The technology employed to increase resolution often reduces signal throughput. The signal-gathering optics can also be a limiting factor, especially fiber-optics that capture a very low solid angle of light from the sample. High signal sensitivity is only critical for sample substances that are weak Raman scatterers.

Many sample substances do not respond to the laser light with fluorescence emission, however, when fluorescence light is emitted from the sample it is often so much more intense than the Raman response that the Raman spectrum of the sample cannot be observed at all. The more important it is to be able to obtain Raman spectra from a wide variety of substances, the more critical it is to employ some technical strategy for reducing the magnitude of fluorescence or the probability of fluorescence.

Fluorescence is arguably the greatest challenge to the application dependability of Raman spectrometry and many solution have been used to solve this problem. Following is a brief description of each including their shortcomings when applied to PRMI.

Multiple laser systems: If serious fluorescence-interference exists for a specific target material with a specific Raman laser, one well-established solution is to configure the Raman spectrometer with more than one laser. Since fluorescence occurs over a specific range of wavelengths, one can simply switch to a laser wavelength that does not excite fluorescence (at least over the spectral range examined by Raman spectrometry). Since some fluorescent centers produce fluorescence over a broad range of wavelengths and since some minerals contain multiple fluorescent centers, it could easily require more than two laser wavelengths to ensure a high likelihood of being able to obtain a Raman spectrum for a wide variety of targets (minerals species). Some Raman systems are configured with 4 or 5 lasers. The limitations of this approach for PRMI are expense and complexity. Employing even two lasers requires much more training and experience to operate and typically results in a Raman system that costs 50% to 90% more than the same model configured with only one laser. Raman systems with 4 and 5 lasers require considerable space, cost, and maintenance.

Sequentially shifted excitation: This type of fluorescence-rejection solution involves either an adjustable-wavelength laser or a dual-wavelength laser. Two Raman spectra are collected using two laser source wavelengths that are very close together. The two spectra are processed with the assumption that Raman features occur in the same position in each spectrum and fluorescence features shift an amount equal to the difference between the source wavelengths. This approach is only slightly less expensive than a multiple-laser system since it avoids the duplication of lasers and other spectrometer components. The limitations of this approach for PRMI are spectral artifacts and breadth of application. While analysis time (the time to collect two spectra instead of one) is also a factor, some systems can collect the two spectra concurrently. Shifted excitation systems are known to produce some non-Raman spectral artifacts out of the spectrum-processing employed. In addition, the greatest limitation is probably the fact that shifted-excitation is ineffective for samples producing fluorescence orders of magnitude brighter than Raman intensities. In these cases the Raman peaks have similar intensity (or less) than electronic noise and the "shot noise" typical of photon counting and cannot be extracted from the dual spectra.

Gated Raman: Gated Raman takes advantage of the difference in time scale in which Raman scattering and fluorescence occur. Employing a high-speed pulsed laser and a fast gating detector, such a Raman system is carefully timed so that the detector is open when the laser pulse hits the sample and closes within a few hundred ps before most or sometimes any fluorescence light can be generated. The laser and detector are controlled to wait until any fluorescence is likely to have decayed and then repeat this excitation/detection pattern as many times as possible—thousands of times per second. The limitations of this approach for PRMI are expense and sensitivity. Until recently all gated-Raman systems were expensive and complex custom-made optical-bench systems. Even the commercial gated Raman system that is now available costs three times as much as non-gated system of otherwise-equivalent sophistication. Additionally, an important implication of the mode of operation of a gated system is that, even if it is operated at a pulse frequency of 100 kHz, it spends only 5% of every second with the detector open and collecting data. Such a system may have to collect data for an impractical period of time for the many minerals that are weak Raman scatterers.

IR Lasers: Many Raman instrument makers offer systems with an IR laser source (e.g., 1064 nm) because there is little likelihood that such a long wavelength source will excite fluorescence. The primary limitation of this approach for PRMI is sensitivity. As stated above, the probability of Raman scattering increases as the wavelength of the excitation source decreases. In fact, Raman intensity increases with the wavelength to the fourth power. This means as the source wavelength gets longer Raman intensities from the same subject drop quickly. Since many minerals are weak Raman scatterers, the IR laser Raman system has limited application to minerals as a whole.

UV lasers: Raman systems employing UV lasers are relatively rare due to their spectral performance challenges and expense. A UV Raman system has to examine a narrow spectral region, making it technologically difficult to achieve adequate spectral resolution and the minimum Raman shift of such systems is typically 350 to 450 nm. The limitations of UV Raman for PRMI are expense and performance. The components required to meet the performance challenges in the UV are expensive and many, many minerals have important Raman peaks at Raman shifts below 400 nm.

Anti-Stokes Raman: In detail, the Raman Effect encompasses wavelength shifts to longer wavelengths (Stokes Raman) and wavelength shifts to shorter wavelengths (Anti-Stokes Raman). Since, in theory, fluorescence produces light at longer wavelengths than the excitation source, it has been proposed that fluorescence-interference can be avoided by configuring a Raman spectrometer to detect Anti-Stokes Raman scattering. The limitations of Anti-Stokes Raman include shorter wavelength fluorescence and Raman intensity limitations. While it is true that narrow-range fluorescence from inner-shell electrons does not occur at wavelengths longer then the excitation source, it has been found that broad-range fluorescence resulting from excited outer-shell electrons extends significantly into wavelengths shorter than the excitation source due to the complex interactions between these electrons through their relaxation pathways. Additionally, Anti-Stokes Raman depends on some of the quantum vibrational states within the target sample being already at an energy level above their ground state when excited by photons from the Raman laser. As a result, Anti-Stokes Raman intensities tend to be weaker than Stokes Raman and Anti-Stokes Raman intensities steadily decrease as the Raman-shift of peaks (from the same sample) increases.

Furthermore, it has become very popular to produce hand-held analyzers for use in field applications. However, this becomes physically and technologically impractical for Raman systems using a shorter wavelength laser source partially due to the physical size of the spectrograph component required to achieve useful spectral resolution. One challenge for a portable/field Raman system is to provide for laser light delivery, signal light collection, and sample visibility for aiming through a single optical port. Many hand-held units and some portables do not even try to provide for optical analysis aiming and depend upon the analysis site being large enough to simply point the optical front end of the analyzer at it. Additionally, a Raman analyzer for PRMI must be efficient at signal light collection to work successfully with weak Raman scatterers and field geologic applications often have a need to analyze mm size mineral grains.

Accordingly, there is a need for a more dependable, efficient, and cost-effective Raman Spectroscopy system for PRMI that avoids the fluorescence-interference problem. Additionally, it is desired that a portable PRMI system be available for in-field or in-house applications. It is also desired that software be available to efficiently assist the PRMI Raman Spectroscopy system with Raman spectrum data-collection, processing, noise-removal, and identification of unknown minerals.

SUMMARY OF THE INVENTION

Accordingly, embodiments of the present invention include a method of identifying materials, and particularly, minerals, and software for Raman spectrum data-collection, processing, and identification of unknown minerals.

In one embodiment of the present invention, a method for identifying minerals, comprises the steps of illuminating a sample holder area having no sample therein for a blank illumination duration with monochromatic light having a wavelength; collecting a blank scattered light resulting from the blank illumination duration using at least one Raman spectrometer detector; executing software in a digital computer to determine a blank spectrum data corresponding to the blank scattered light; illuminating a mineral sample in the sample holder area for a first illumination duration with the same monochromatic light and collecting a first scattered light resulting from the first illumination duration using the at least one Raman spectrometer detector; executing software in a digital computer to determine a first Raman spectrum data corresponding to the first scattered light; and executing software in a digital computer to determine a true Raman spectrum data determined by a difference between the first Raman spectrum data and the blank spectrum data. Desirably, the method includes additional steps of illuminating the mineral sample for a second or more illumination duration(s) with the same monochromatic light and collecting second or more scattered light resulting from the second illumination duration(s) using the at least one Raman spectrometer detector; executing software in a digital computer to determine second or more Raman spectrum data corresponding to the second or more scattered light; executing software in a digital computer to determine an aggregated Raman spectrum data corresponding to the first scattered light and the second or more scattered light; and executing software in a digital computer to determine the true Raman spectrum data determined by a difference between the aggregated Raman spectrum data and the blank spectrum data. Preferably, the monochromatic light has a wavelength in the range of about 400 nm to about 425 nm. Preferably the Raman spectrometer detector is adapted to detect a Raman-shift range of about 100 cm$^{-1}$ to about 1400 cm$^{-1}$.

The true Raman spectrum data is compared to one or more reference spectrums to determine if the true Raman spectrum data corresponds to one or more reference spectrums by a software process executed on a digital computer. Preferably, the reference spectrums comprise mathematical models of Raman spectrums of different minerals and/or noise-free reference spectrum data sets generated by mathematical models of Raman spectrums of minerals.

One or more of: (a) a name and/or chemical composition of one or more minerals identified by the one or more reference spectrums corresponding to the true Raman spectrum data; (b) the true Raman spectrum data; and (c) the one or more reference spectrums corresponding to the true Raman spectrum data are output by display on a screen, printout, and/or saving to a data file when reference spectrum(s) corresponding to the true Raman spectrum data are identified.

The determination of whether the one or more reference spectrums corresponding to the true Raman spectrum data is preferably provided by calculating an identification score for each reference spectrum relative to the true Raman spectrum data using a formula that includes both a coincident-peak term and a missing-peak-penalty term. In one embodiment, the identification score is determined by the formula: IDscore=sum(($a_i$+$b_i$)/2−V*abs($a_i$−$b_i$)*(1−min($a_i$,$b_i$))^U), wherein $a_i$ and $b_i$ are the intensities of the true first spectrum data and the reference spectrum, respectively, at the i$^{th}$ value of Raman shift, and V and U are user-selectable parameters.

The calculated identification scores can be sorted in descending order; and an output may be presented that includes one or more of: (a) a name and/or chemical composition of one or more minerals identified by one or more reference spectrums corresponding to the true Raman spectrum data; (b) the true Raman spectrum data; (c) the one or more reference spectrums corresponding to the true Raman spectrum data; and (d) the calculated identification score of the one or more reference spectrums corresponding to the true Raman spectrum data.

The method desirably also provides that if collected spectrum data indicates saturation of a detector used to receive the scattered light, then that spectrum data is not used in calculating the true Raman spectrum data, and preferably, the method automatically runs an additional test cycle where the time period of the additional illumination duration is less than the illumination durations that caused saturation in the detector.

Similarly, if a minimum if a signal-to-noise ratio minimum is not met and the Raman spectrum data does not indicate the presence of at least one peak, then the method automatically runs an additional test cycle where the time period of the additional illumination duration is greater than the illumination durations of the prior test cycles.

In one embodiment of the present invention, a computer readable medium accessible by at least one processor and at least one Raman spectrometer for identifying materials is provided. The computer readable medium includes software instructions executable by the at least one processor for: (A) instructing a monochromatic light source to illuminate a sample-free area for a first illumination duration with monochromatic light; (B) receiving a blank spectrum data corresponding to first scattered light collected by the at least one detector and resulting from the first illumination duration; (C) instructing the monochromatic light source to illuminate a material sample for a second illumination duration with monochromatic light; (D) receiving a first spectrum data corresponding to second scattered light from the material sample collected by the at least one detector and resulting from the second illumination duration; (E) subtracting the blank spectrum data from the first spectrum data, resulting in a true first spectrum data; and (F) comparing the true first spectrum data to one or more reference spectrums to determine a match.

In some embodiments, the comparison of step (F) includes: (i) calculating a identification score for each reference spectrum relative to the true first spectrum data that includes both a coincident-peak term and a missing-peak-penalty term such as: IDscore=sum(($a_i+b_i$)/2−V*abs($a_i-b_i$)*(1−min($a_i,b_i$))^U), wherein $a_i$ and $b_i$ are the intensities of the true first spectrum data and the reference spectrum, respectively, at the $i^{th}$ value of Raman shift, and V and U are user-selectable parameters; (ii) sorting the calculated identification scores in descending order; and (iii) outputting the sorted identification scores for viewing by a user.

In some embodiments, the computer readable medium includes additional software instructions for: (G) analyzing a first signal-to-noise ratio of the true first spectrum data; (H) receiving a user-selected signal-to-noise ratio target; and (I) if the signal-to-noise ratio is met, then: (i) repeating steps C-G to generate a true second spectrum data and a second signal-to-noise ratio; (ii) comparing the first and second signal-to-noise ratios; and (iii) if the second signal-to-noise ratio is less than the first signal-to-noise ratio, alerting the user to possible damage to the material sample.

In some embodiments, the computer readable medium includes additional software instructions for: (J) if the first spectrum data indicates saturation of a detector used to receive the scattered light, then: (i) instructing the monochromatic light source to illuminate the material sample for a third illumination duration with monochromatic light, wherein the third illumination duration is less than the second illumination duration; (ii) receiving a third spectrum data corresponding to third scattered light from the material sample collected by the at least one detector and resulting from the third illumination duration; (iii) repeating step (E) to determine a true third spectrum data; and (iv) storing the true third spectrum data.

In some embodiments, the computer readable medium includes additional software instructions for: (K) if the signal-to-noise ratio target is not met and if the first spectrum data does not indicate the presence of at least one peak, then: (i) instructing the monochromatic light source to illuminate the material sample for a fourth illumination duration with monochromatic light, wherein the fourth illumination duration is more than the second illumination duration; (ii) receiving a fourth spectrum data corresponding to fourth scattered light from the material sample collected by the at least one detector and resulting from the fourth illumination duration; (iii) repeating step (E) to determine a true fourth spectrum data; and (iv) storing the true fourth spectrum data; and (L) if the signal-to-noise ratio target is not met and if the first spectrum data indicates the presence of at least one peak, then: (i) calculating a fifth illumination duration intended to achieve the signal-to-noise ratio target; (ii) instructing the monochromatic light source to illuminate the material sample for the fifth illumination duration with monochromatic light; (iii) receiving a fifth spectrum data corresponding to fifth scattered light from the material sample collected by the at least one detector and resulting from the fifth illumination duration; (iv) repeating step (E) to determine a true fifth spectrum data; and (v) storing the true fifth spectrum data.

In some embodiments, prior to step (C), the computer readable medium includes additional software instructions for receiving a user-selected maximum total exposure time. The medium also includes software instruction for limiting a total illumination time based on the user-selected maximum total exposure time.

In some embodiments, prior to step F, the computer readable medium includes additional software instructions for removing noise from the one or more reference spectrums.

In an alternative embodiment of the present invention, a computer readable medium accessible by at least one processor and at least one storage is provided. The computer readable medium includes software instructions executable by the at least one processor for: (A) instructing a monochromatic light source to illuminate a material sample for a first illumination duration with monochromatic light; (B) receiving a first spectrum data corresponding to scattered light from the material sample collected by at least one detector and resulting from the first illumination duration; and (C) comparing the first spectrum data to one of more reference spectrums to determine a match, the comparison including: (i) calculating a identification score for each reference spectrum relative to the true first spectrum data using a formula that includes both a coincident-peak term and a missing-peak-penalty term such as: IDscore=sum(($a_i+b_i$)/2−V*abs($a_i-b_i$)*(1−min($a_i,b_i$))^U), wherein $a_i$ and $b_i$ are the intensities of the true first spectrum data and the reference spectrum, respectively, at the $i^{th}$ value of Raman shift, and V and U are user-selectable parameters; (ii) sorting the calculated identification scores in descending order; and (iii) outputting the sorted identification scores for viewing by a user.

In some embodiments, prior to step (A), the computer readable medium includes additional software instructions for instructing a monochromatic light source to illuminate a sample-free area for a second illumination duration with monochromatic light, and receiving a blank spectrum data corresponding to second scattered light collected by the at least one detector and resulting from the second illumination duration.

In some embodiments, prior to step (C), the computer readable medium includes additional software instructions for subtracting the blank spectrum data from the first spectrum data, resulting in a true first spectrum data that is used in the Identification score formula of step (C)(i).

In some embodiments, the computer readable medium includes additional software instructions for: (D) analyzing a first signal-to-noise ratio of the first spectrum data; (E) receiving a user-selected signal-to-noise ratio target; and (F) if the signal-to-noise ratio target is met, then: (i) repeating steps (A)-(D) to generate a second spectrum data and a second signal-to-noise ratio; (ii) comparing the first and second signal-to-noise ratios; and (iii) if the second signal-to-noise ratio is less than the first signal-to-noise ratio, alerting the user to possible damage to the material sample.

In some embodiments, the computer readable medium includes additional software instructions for: (G) if the first spectrum data indicates saturation of a detector used to receive the scattered light, then: (i) instructing the monochromatic light source to illuminate the material sample for a third illumination duration with monochromatic light, wherein the third illumination duration is less than the first illumination duration; (ii) receiving a third spectrum data corresponding to third scattered light from the material sample collected by the at least one detector and resulting from the third illumination duration; and (iii) storing the third spectrum data.

In some embodiments, the computer readable medium includes additional software instructions for: (H) if the signal-to-noise ratio is not met and if the first spectrum data does not indicate the presence of at least one peak, then: (i) instructing the monochromatic light source to illuminate the material sample for a fourth illumination duration with monochromatic light, wherein the fourth illumination duration is more than the first illumination duration; (ii) receiving a fourth spectrum data corresponding to fourth scattered light from the material sample collected by the at least one detector and resulting from the fourth illumination duration; and (iii) storing the fourth spectrum data; and (I) if the signal-to-noise ratio is not met and if the first spectrum data indicates the presence of at least one peak, then: (i) calculating a fifth illumination duration intended to achieve the signal-to-noise ratio target; (ii) instructing the monochromatic light source to illuminate the material sample for the fifth illumination duration with monochromatic light; (iii) receiving a fifth spectrum data corresponding to fifth scattered light from the material sample collected by the at least one detector and resulting from the fifth illumination duration; and (iv) storing the fifth spectrum data.

In some embodiments, prior to step (A), the computer readable medium includes additional software instructions for receiving a user-selected maximum total exposure time. The medium also includes software instruction for limiting a total illumination time based on the user-selected maximum total exposure time.

In some embodiments, prior to step (C), the computer readable medium includes additional software instructions for removing noise from the one or more reference spectrums.

In another embodiment of the present invention, a computer readable medium accessible by at least one processor and at least one storage is provided. The computer readable medium includes software instructions executable by the at least one processor for: (A) instructing a monochromatic light source to illuminate a sample-free area for a first illumination duration with monochromatic light; (B) receiving a blank spectrum data corresponding to first scattered light collected by at least one detector and resulting from the first illumination duration; (C) instructing the monochromatic light source to illuminate a material sample for a second illumination duration with monochromatic light; (D) receiving a first spectrum data corresponding to second scattered light from the material sample collected by the at least one detector and resulting from the second illumination duration; (E) subtracting the blank spectrum data from the first spectrum data, resulting in a true first spectrum data; and (F) comparing the true first spectrum data to one or more reference spectrums to determine a match, the comparison including: (i) calculating an identification-score for each reference spectrum relative to the true first spectrum data using a formula that includes both a coincident-peak term and a missing-peak-penalty term such as: IDscore=sum(($a_i$+$b_i$)/2−V*abs($a_i$−$b_i$)*(1−min($a_i$,$b_i$))^U), wherein $a_i$ and $b_i$ are the intensities of the true first spectrum data and the reference spectrum, respectively, at the value of Raman shift, and V and U are user-selectable parameters; (ii) sorting the calculated identification scores in descending order; and (iii) outputting the sorted identification scores for viewing by a user.

In some embodiments, the computer readable medium includes additional software instructions for: (G) analyzing a first signal-to-noise ratio of the true first spectrum data; (H) receiving a user-selected signal-to-noise ratio target; and (I) if the signal-to-noise ratio target is met, then: (i) repeating steps (C)-(G) to generate a true second spectrum data and a second signal-to-noise ratio; (ii) comparing the first and second signal-to-noise ratios; and (iii) if the second signal-to-noise ratio is less than the first signal-to-noise ratio, alerting the user to possible damage to the material sample.

In some embodiments, the computer readable medium includes additional software instructions for: (J) if the true first spectrum data indicates saturation of a detector used to receive the scattered light, then: (i) instructing the monochromatic light source to illuminate the material sample for a third illumination duration with monochromatic light, wherein the third illumination duration is less than the second illumination duration; (ii) receiving a third spectrum data corresponding to third scattered light from the material sample collected by the at least one detector and resulting from the third illumination duration; (iii) repeating steps (E)-(G) to determine a true third spectrum data for use in the Identification score formula of step (F)(i); and (iv) storing the true third spectrum data; (K) if the signal-to-noise ratio target is not met and if the true first spectrum data does not indicate the presence of at least one peak, then: (i) instructing the monochromatic light source to illuminate the material sample for a fourth illumination duration with monochromatic light, wherein the fourth illumination duration is more than the second illumination duration; (ii) receiving a fourth spectrum data corresponding to fourth scattered light from the material sample collected by the at least one detector and resulting from the fourth illumination duration; (iii) repeating steps (E)-(G) to determine a true fourth spectrum data for use in the Identification score formula of step (F)(i); and (iv) storing the true fourth spectrum data; and (L) if the signal-to-noise ratio is not met and if the true first spectrum data indicates the presence of at least one peak, then: (i) calculating a fifth illumination duration intended to achieve the signal-to-noise ratio target; (ii) instructing the monochromatic light source to illuminate the material sample for the fifth illumination duration with monochromatic light; (iii) receiving a fifth spectrum data corresponding to fifth scattered light from the material sample collected by the at least one detector and resulting from the fifth illumination duration; (iv) repeating steps (E)-(G) to determine a true fifth spectrum data for use in the Identification score formula of step (F)(i); and (v) storing the true fifth spectrum data.

In some embodiments, prior to step (C), the computer readable medium includes additional software instructions for receiving a user-selected maximum total exposure time. The medium also includes software instruction for limiting a total illumination time based on the user-selected maximum total exposure time.

In some embodiments, prior to step (F), the computer readable medium includes additional software instructions for removing noise from the one or more reference spectrums.

In yet another embodiment of the present invention, a computer readable medium accessible by at least one processor and at least one storage is provided. The computer readable medium includes software instructions executable by the at least one processor for: (A) retrieving, from the storage, spectrum data; (B) applying a five-point moving average smoothing to the spectrum data; (C) normalizing the spectrum data to its strongest peak; (D) estimating a root mean square noise of the spectrum data; (E) adding a baseline model to the spectrum data; (F) performing an iterative loop for: (i) identifying a first potential peak position; (ii) creating a second model at the potential peak position; (iii) fitting the second model to the spectrum data; (iv) calculating intensity residuals between the spectrum data and the second model; (v) identifying a second potential peak position; (vi) comparing the estimated height of the second potential peak position to a minimum peak-size limit based on the root mean square noise of the spectrum data; (vii) if the second potential peak position has an estimated height greater than the minimum peak-size limit, repeating steps (i)-(vi); (viii) if the second potential peak position has an estimated height less than the minimum peak-size limit, exiting the iterative loop; (G) subtracting the baseline model from a spectrum model resulting from step (F); and (H) outputting the spectrum model to a display.

In some embodiments, the spectrum data is reference spectrum data from a database or library of reference spectra.

In some embodiments, step (D) includes additional software instructions for: (i) fitting a series of spaced data points to a spline curve over a sub-region of the first model; and (ii) calculating the root mean square of residuals between the data points in the sub-region.

Additional features and details of embodiments of the invention will now be described in reference to the drawings.

BRIEF DESCRIPTION OF THE DRAWINGS

FIG. 7b is a graph showing the final Raman spectrum model resulting from applying the noise-reduction software of the present invention to the instrumental data of FIG. 7a.

DETAILED DESCRIPTION OF THE INVENTION

Figure 1:
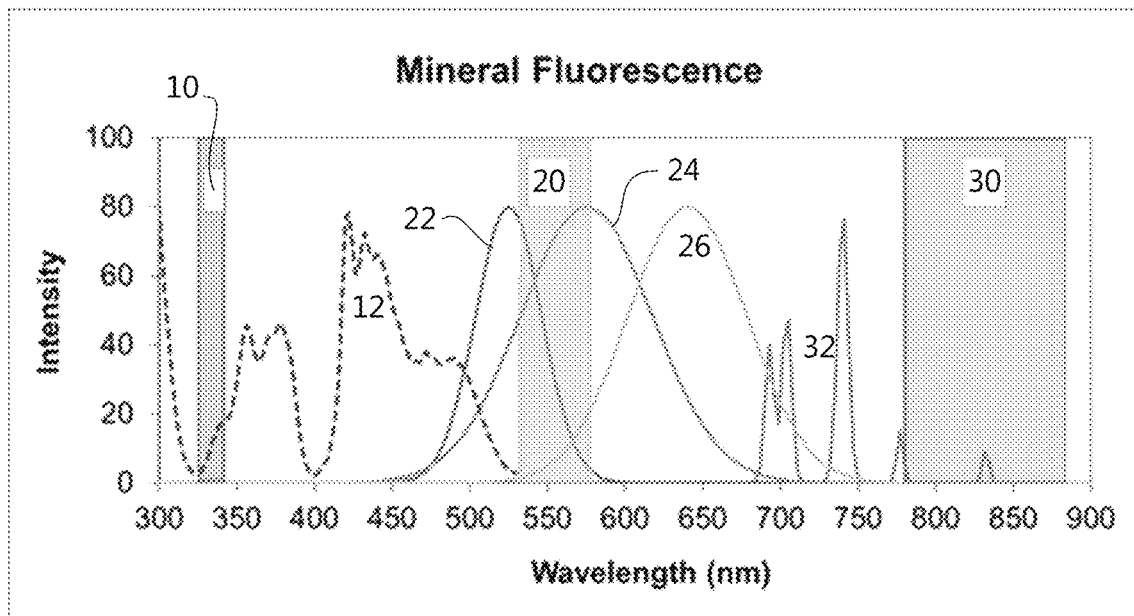
FIG. 1 is a graph displaying the characteristics of mineral fluorescence.

Referring now to the drawings, wherein like reference numerals designate corresponding structures throughout the views. The following examples are presented to further illustrate and explain the present invention and should not be taken as limiting in any regard.

FIG. 1 is a chart representing the characteristics of mineral fluorescence. Peaks 22, 24, and 26 are $Mn^{2+}$ fluorescence peaks for willemite, hardysonite, and rhodonite, respectively. The group of sharper peaks 32 are $Sm^{2+}$ fluorescence peaks for anhydrite. The dashed curve 12 is the excitation spectrum for the willemite $Mn^{2+}$ fluorescence 22 showing what source wavelengths produce higher or lower intensity fluorescence. The bands of the spectrum 10, 20, and 30 show what portion of the spectrum a Raman spectrometer looks at with a 325 nm, 532, and 780 nm laser respectively. Each band represents Raman shifts from 0 to 1500 wavenumbers ("$cm^{-1}$").

Fluorescence is arguably the greatest challenge to the application dependability of Raman spectroscopy. To describe the present solution to this problem, it is first necessary to review the nature of fluorescence as well as important distinctions between the Raman Effect and fluorescence.

The Nature of Fluorescence: Fluorescence also begins with absorption of photon energy from an incident radiation source (such as a Raman laser), but it results from excitation of electrons to higher energy levels (instead of excitation of inter-atomic vibrational energy levels). Some amount of this absorbed energy is generally transferred to the vibration/rotation of other atoms of the substance (thermal relaxation). In many cases all of the absorbed energy is thermally distributed, but in some cases a photon is emitted carrying the remaining energy (radiative relaxation)—this is fluorescence emission.

Fluorescent Centers: Quite often which materials are and are not fluorescent is predictable since certain elements (e.g., transition metals and rare earth elements) are predictably prone to fluorescence, especially in certain valence states and electronic environments (i.e., crystal structures). Such element/structure combinations form fluorescent centers. Often only minor or trace concentrations of such elements are required to produce even high intensity fluorescence.

Spectrometry of Fluorescence: It is important to review the spectral width, spectral position, and excitation spectrometry of specific fluorescent centers. When the photon-excited electrons are outer shell (valence) electrons (e.g., transition metals), their ground state energy (in a crystalline solid) is highly variable due to the influence of nearby atoms and their thermal oscillations. The resulting fluorescence has a specific peak center but has a broad peak shape with FWHM on the order of 50 to 100 nm, depicted in FIG. 1 as $Mn^{2+}$ fluorescence peaks 22-26. When the excited electrons are interior-shell electrons (common for rare earth elements) the nearby atomic/electronic influence has much less effect on ground state energy and the resulting fluorescence is characterized by much narrower peaks with FWHM on the order of 5 to 40 nm—often a family of narrow peaks from a single fluorescent center, seen in FIG. 1 as $Sm^{2+}$ fluorescence peaks 32. While the position of the fluorescence peak for a specific fluorescent center can vary from one material/mineral to another up to 100 nm or more, its position is still restricted to a specific region of the optical spectrum. Again, fluorescence from interior shell electrons exhibits less variation in spectral position from one material to another. Before fluorescence can happen the relevant electrons must absorb photon energy to be excited. While most of the geoscience community thinks of mineral fluorescence as requiring excitation by a UV light source, the primary requirement is a light source at a shorter wavelength than the resulting fluorescence. For example, a NIR Raman laser at 780 to 785 nm is quite efficient at exciting $Nd^{3+}$ fluorescence centered in the IR (880-1100 nm). Additionally, the probability of absorption/excitation is dependent on local electronic structure so that specific wavelengths are more likely to produce electron excitation than others. FIG. 1 shows the excitation spectrum 12 for the 525 nm $Mn^{2+}$ fluorescence of willemite 22. The curve shows how the intensity of the $Mn^{2+}$ fluorescence as the wavelength of the source varies from 300 nm to 520 nm.

Intensity of Fluorescence: It is important to review the relative intensity of fluorescent light compared to the intensity of Raman scattering. The intensity of fluorescent light can range from similar to Raman intensities to orders of magnitude higher. The absolute intensity of fluorescence is not even the deciding factor. Since the intensity of Raman scattering varies orders of magnitude among the various natural minerals, in some cases a very moderate amount of fluorescence can completely overwhelm and mask the Raman spectrum of a mineral. It is relevant here to note in the example excitation spectrum 12 in FIG. 1 that, while most of the features such wavelength-dependence of excitation efficiency are going to vary wildly from one mineral to another, it can be expected that excitation efficiency will always drop down precipitously as the incident wavelength approaches the center wavelength of the resulting fluorescence. Also, since fluorescence often results from minor to trace amounts of a fluorescent center, different samples of the same mineral species can produce wildly different amounts (and even colors) of fluorescence (including zero).

Range of Optical Fluorescence: There are limits to the range of wavelength over which optical fluorescence occurs. As the wavelength of the source gets longer, into the IR, it becomes less likely that the incident photons will be energetic enough to excite electron transitions. At the other end of the spectrum, into the UV, it becomes relevant that the region of the spectrum sampled by a Raman spectrometer is a swath of wavelengths that becomes more narrow as the wavelength of the exciting laser becomes shorter, depicted in FIG. 1 as the bands of the spectrum 10, 20, and 30 show what portion of the spectrum a Raman spectrometer looks at with a 325 nm, 532 nm, and 780 nm laser respectively. While many fluorescent centers are excited by a UV source the wavelength of the resulting fluorescence is rarely in the UV as well—in the wavelength range of a Raman spectrometer.

Additionally, to optimize Raman spectroscopy for RMI it is important to review the nature of Raman spectra of minerals and how they differ from other materials that are typically examined via Raman. The relevant details include spectra range, Raman intensities, relative intensity of Raman peaks, and specimen damage.

Spectra Range: Most Raman instruments offer a Raman-shift range that goes up to 3000, 4000, or even 5000 $cm^{-1}$; many offer a minimum Raman-shift of 200 $cm^{-1}$; and, as mentioned above, some have minimum Raman-shift limits of 350 to 450 $cm^{-1}$. Minerals as a group generally have most of their Raman peaks below 1200 $cm^{-1}$ and some minerals (e.g., sulfides) have most or all of their Raman peaks below 500 $cm^{-1}$. While many minerals containing light element clusters like $H_2O$, OH, and $CO_3$ have Raman peaks out beyond 2500 $cm^{-1}$, inclusion of these peaks is not necessary for the mineral identification task. Exceptions to these generalizations that are worth noting are graphite and diamond. Diamonds typically have only one Raman peak near 1335 $cm^{-1}$ and the Raman peaks of graphite begin with a strong peak near 1580 $cm^{-1}$.

Raman Intensities: The range of Raman intensities that can be expected from minerals spans four orders of magnitude. Many important minerals, such as ore minerals, produce rather weak to very weak Raman intensities.

Relative Intensity of Raman Peaks: While the position of Raman peaks (in Raman-shift) is generally independent of the wavelength of the incident laser, the relative intensity of Raman peaks is variable in minerals for two reasons. First, since minerals are crystalline, every unit cell or "molecule" in a single mineral grain has the same orientation in space. This leads to variations in relative intensity of Raman peaks in response to variations in the spatial/angular relationship between axes of the crystal structure and the directional axis and plane of polarization of the Raman laser beam. Second, in common with materials other than minerals, relative intensity of Raman peaks typically does change with the wavelength of the Raman laser.

Specimen Damage: A significant number of minerals, including ore minerals such as sulfides and sulfosalts, are prone to alteration in response to heating by the Raman laser. This can take the form of anything from phase transformations to outright destruction.

Identifying minerals with Raman spectrometry, as with any other example of fingerprint-style identification, consists of collecting a clear, characteristic spectrum (free of artifacts not characteristic of the target), preparing that spectrum (may include trimming, background removal, smoothing) and then comparing that spectrum to every entry in a database of spectra from known minerals. Some kind of match scoring system is used to present the user with a short list of the best matches. There are challenges to completing this task at almost every step.

Clear spectrum: A clear spectrum has sufficient signal strength to distinguish peaks characteristic of the target from noise and background. Due to the very large range of Raman intensities that can be expected from different mineral targets, a Raman user cannot set up a standard set of data collection parameters and apply this repeatedly to a range of different minerals. Additionally, the subset of minerals having very weak Raman intensities not only require long counting times, but extra care is required to distinguish their Raman spectra from weak artifacts of the instrument and even the weak signal received from the air above the target. Finally, broad-spectrum fluorescence (e.g., $Mn^{2+}$ fluorescence 22-26 in FIG. 1) appears in the narrow spectral view of a Raman spectrometer as high intensity continuum background—at times so intense that Raman peaks are lost. Even when Raman peaks are still discernable above high intensity fluorescence, this fluorescence background often does not vary with wavelength smoothly enough for most background-removal algorithms to factor it out.

Characteristic spectrum: In some instances fluorescence light can be present in the form of one or more peaks having similar shape and intensity to Raman peaks, particularly narrow (e.g., REE) fluorescence in the range of a longer wavelength Raman system. Additionally, specimen damage often results in both decreasing (including complete quenching) of the Raman peaks characteristic of the (unaltered) mineral and appearance of very different Raman peaks characteristic of what the laser beam has altered the target mineral into.

Spectrum preparation: Spectrum preparation generally includes subtracting a measured detector background, removal of cosmic ray events, and subtracting signal background, and may include smoothing. When working with minerals having weak Raman intensities it is common, if not typical, to find that the instrumental output includes spectral features that are not characteristic of the subject mineral, but characteristic of the spectrometer and the air and/or other materials in the path of the spectrometer optics. While such features are weak enough to be inconsequential when the Raman signal is strong, when the Raman signal is weak they are problematic and not amenable to standard spectrum preparation methods.

Match scoring: Since Raman spectra of minerals contain peaks of varying width and generally contain overlapping peaks, whole-spectrum matching via match-scoring of every spectral channel is generally employed. Due to the potential for relative Raman intensities from minerals to vary with crystallographic orientation and Raman laser wavelength, an effective match scoring algorithm for RMI must be relatively insensitive to relative intensity. Considerable improvement in mineral identification is achieved simply by square-root squashing (normalizing followed by taking the square root of all intensities). However, even this squashing technique does not recognize the significance to the match quality when one spectrum has a strong peak where the compared spectrum does not.

Reference database: Successful mineral identification via comparison with a collection of reference spectra (i.e., Raman spectra of known minerals) requires that such a collection be both complete and high quality. For PRMI, a truly complete reference database is not critical since many hundreds of the over 5000 known mineral species are truly rare. On the other hand, it is difficult to gather high signal-to-noise ratio ("S/N") reference spectra on the many weak-Raman minerals. Since whole-spectrum matching includes spectrometer intensities in-between the Raman peaks, it has been found that an even modestly noisy (low S/N) reference spectrum with wide spaces between very few peaks can be erroneously matched to a noisy unknown spectrum simply because there was a high incidence of high points in the noise of the unknown spectrum being coordinated by chance with high points in the background noise of the reference spectrum. Such problems with noise in the reference spectra only increase when square-root squashing of spectra is employed. The improvement to pattern-match identification offered by squashing only works if both the unknown spectrum and all of the reference spectra are squashed in the same manner and, while squashing reduces the contrast between the strongest and weakest peaks in the spectrum, it also inherently magnifies noise amplitude.

The Raman spectroscopy system of the present invention is optimized for PRMI by addressing the challenges described above without becoming prohibitively expensive, bulky, or difficult to operate.

Preferably, the Raman spectroscopy system of the present invention uses a single laser operating within the ideal wavelength range that enables the greatest dependability for analysis of minerals while avoiding the expense and/or complexity of multiple lasers, gated spectrometry, or UV lasers. The ideal portion of the visible light spectrum for PRMI is chosen based upon the intersection of the following factors: (1) Existing data on the fluorescence spectra of minerals must be evaluated from the point of view of where (in the visible spectrum) they do not fluoresce with appropriate attention given to the relationship between the excitation wavelength and the region of fluorescence output. (2) While there exist fluorescence centers in natural minerals that produce fluorescent light within every portion of the extended light spectrum (UV through IR), not all fluorescence centers are equally common in natural minerals. (3) The intensity of Raman scattering from the same sample increases strongly as the wavelength of the Raman laser decreases. Thus, the same intensity of fluorescence is less problematic to collecting a Raman spectrum with shorter wavelength Raman lasers. (4) While the level of technology required, and therefore expense and even size of the Raman system, becomes steadily greater as the Raman laser wavelength is taken towards and into the UV, there is a distinct break in the availability of laser cutoff filters capable of producing an acceptable minimum Raman-shift at 400 nm.

Figure 2:
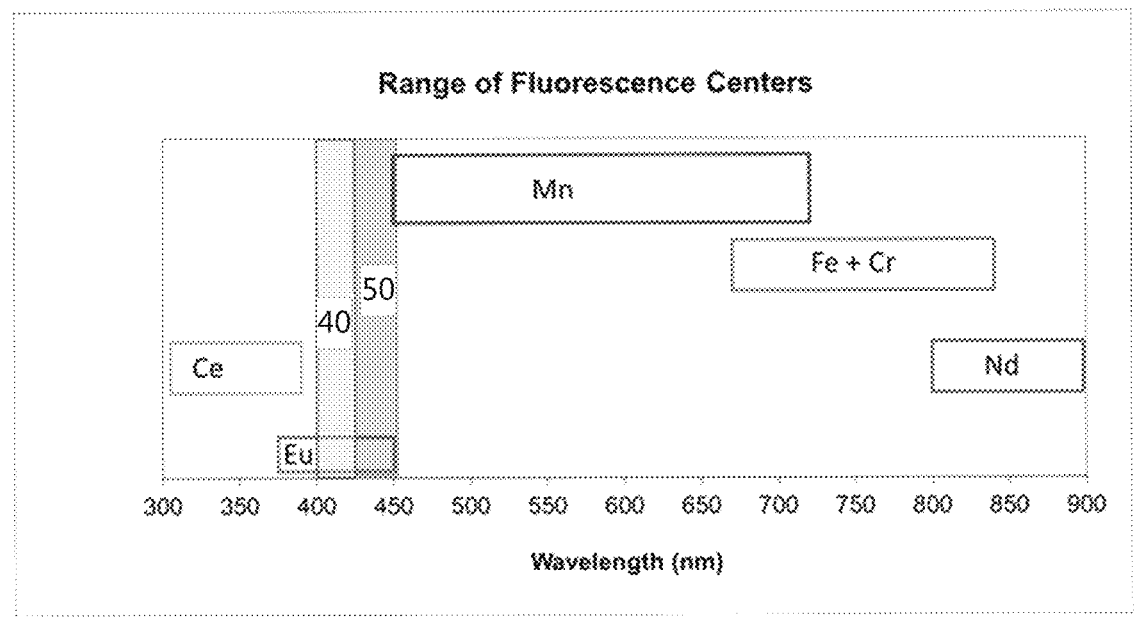
FIG. 2 is a graph displaying the spectral range of the most important fluorescence centers and the optimal range of Raman laser sources for PMRI according to an embodiment of the present invention.

The fluorescence spectrometry of many individual minerals has been studied and their respective fluorescence centers identified. By far the most common fluorescence center is $Mn^{2+}$ which can produce a fluorescence center when substituted into crystallographic sites nominally containing $Na^{2+}$, $Mg^{2+}$, $Ca^{2+}$, $Zn^{2+}$, or $Al^{3+}$. Of lower probability of producing a fluorescence center are $Fe^{3+}$ and $Cr^{3+}$, substituting primarily for $Al^{3+}$, and many of the rare earth elements, substituting primarily for Ca. In addition to the likelihood that these elements will form fluorescence centers, a practical evaluation must also consider the crustal abundance of these elements, which translates directly into the likelihood that they will be present in concentrations sufficient to produce significant fluorescence in a wide range of natural examples. FIG. 2 shows the range of the extended visible spectrum where fluorescence from Mn, and Fe and Cr occur. Additionally, the range of fluorescence from the REE with the highest crustal abundances, Nd and Ce, are shown. Even though the crustal abundance of Eu is less than $1/10$ that of Nd and Ce, and $1/500$ that of Mn, the fluorescence range of Eu is shown as well since it tends to be naturally concentrated in some common minerals like feldspars and fluorite.

Notably, there is, in fact, no region of the spectrum where no minerals fluoresce. However, a region where mineral fluorescence tends to be uncommon and Raman intensities tend to be stronger is important to achieve the most practical (in size, complexity, and expense) Raman configuration—the single laser system. Therefore, the ideal range for Raman laser sources for PRMI is between the technological transition for cutoff filters—400 nm—and the wavelength where a Raman spectrometer (with a 1500 $cm^{-1}$ Raman shift range) will begin to capture some of the intense and common Mn fluorescence—425 nm. As depicted in FIG. 2, area 40 represents the 400-425 nm range for PRMI lasers, and area 50 represents the spectral range of a Raman system using a 425 nm laser source and viewing Raman shifts up to 1500 cm$^{-1}$. Testing conducted by the inventor on a group of 80 mineral species with a 405 nm Raman system found only one mineral that produced a problematic level of fluorescence (fluorite). This is a failure rate of 1.25%, while the failure rate of a similar study with a 780 nm laser was 15%.

Figure 3:
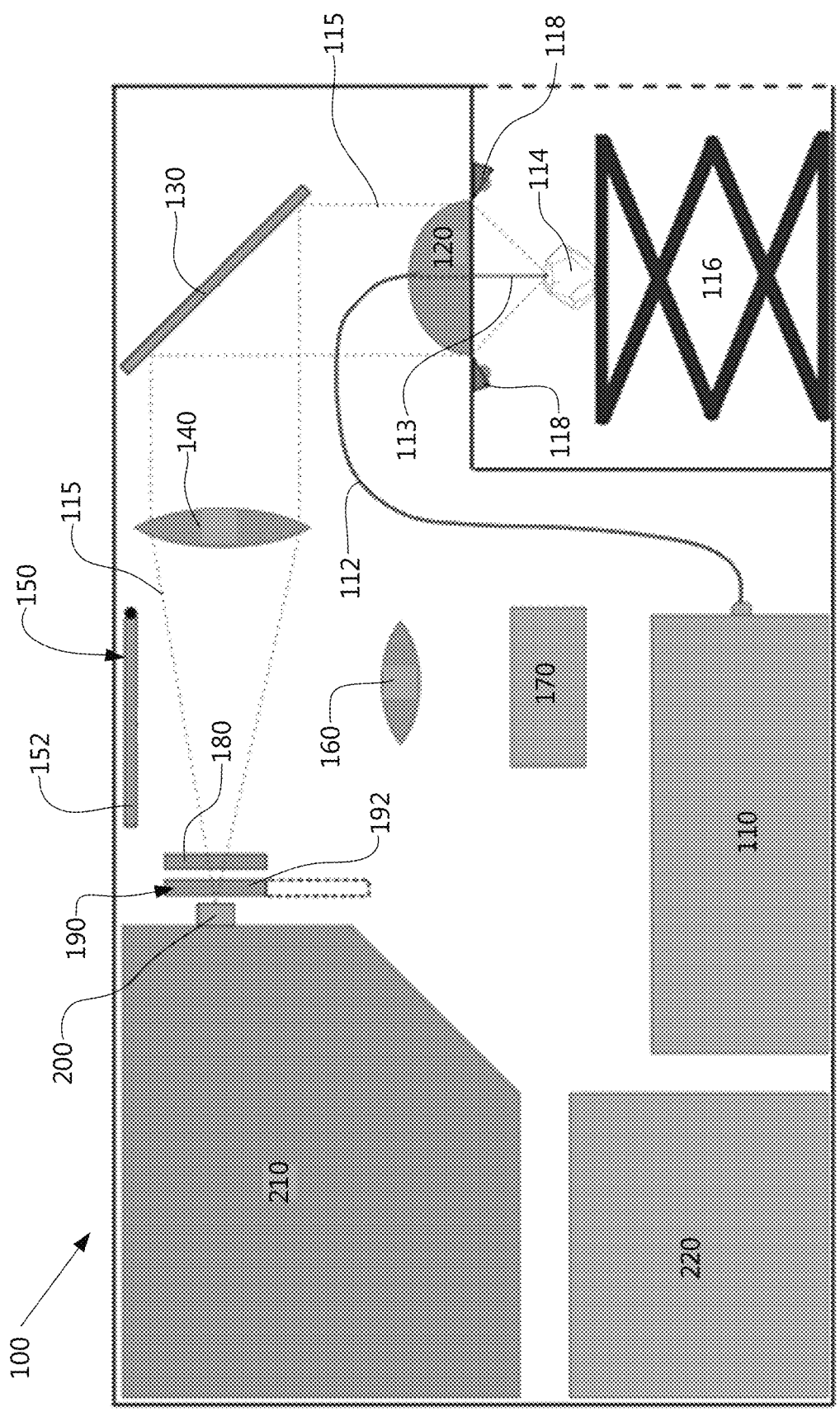
FIG. 3 is a diagram of the components of a Raman Spectroscopy system according to an embodiment of the present invention.

FIG. 3 represents a Raman spectroscopy system 100 according to a preferred embodiment of the present invention. Raman system 100 includes a monochromatic light source, such as laser device 110; a sample 114 to be analyzed; and a spectrograph 210 optimized for light throughput and detector sensitivity. Preferably, laser device 110 is a stabilized Raman laser operating in the 400 nm to 425 nm range including an appropriate cleanup filter to isolate the desired emission line of the laser and a depolarization filter to minimize the impact of crystallographic orientation of target minerals on relative Raman intensities. In some embodiments, laser device 110 is configured for fiber optic delivery of the laser beam 113 to the sample 114 through fiber optic cable 112. In other embodiments, the laser beam 113 is delivered to the sample 114 through coaxial laser insertion optics, such as a 70/30 partially reflecting mirror.

The sample 114 rests on a holder 116, depicted in FIG. 3 as a flexible scissor-jack presentation stage. However, any other sample holder designed to handle a variety of common geological sample types is sufficient. Preferably, a typical system for excluding ambient light during data collection is included in the sample-presentation portion of the instrument, such as a hard enclosure or a heavy opaque curtain to exclude ambient light from the sample chamber after the sample 114 is loaded onto the holder 116. In some embodiments, the sample chamber also includes at least one visible light source 118, such as a high-output LED, to illuminate the sample 114 when positioning the sample 114 and aiming the laser beam 113.

Figure 5:
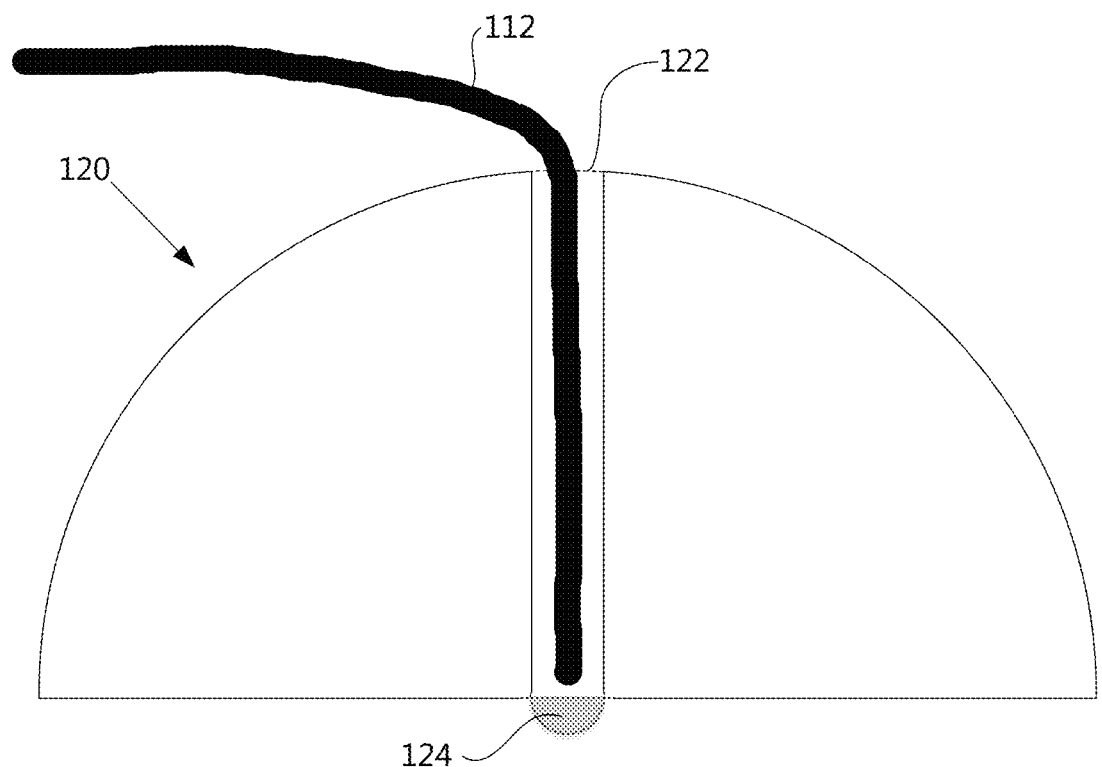
FIG. 5 is a side section view of the objective lens of FIG. 3.

In embodiments utilizing fiber optic cable 112, the Raman system 100 preferably includes an objective lens 120 having an opening 122 to accept the end of the fiber optic cable 112, and a focusing lens 124 positioned within the opening 122, as depicted in FIG. 5. Preferably, the opening 122 is a hole drilled through the center of the objective lens 120. In preferred embodiments, the focusing lens 124 positioned within the opening 122 after the end of the fiber optic cable 112 such that the laser beam 113 passes through the focusing lens 124. Although the drawing figures show the objective lens 120 as a plano-convex objective lens, any differently shaped lens is sufficient, provided it has a large diameter and short focal length. The short focal length (high numerical aperture) lens collects a high solid angle of scattered/signal light 115 from the sample 114 while the fiber optic cable 112 feedthrough provides laser excitation without requiring delivery through the same optics used for observation and signal collection.

In preferred embodiments, the signal light 115 passes through objective lens 120 and is deflected by a primary redirection mirror 130 to a primary focusing lens 140 designed to focus the signal light 115 onto a spectrograph 210. In some embodiments, the optics are arranged such that deflection is unnecessary, and the signal light 115 passes directly from the objective lens 120 to the primary focusing lens 140.

Figure 4:
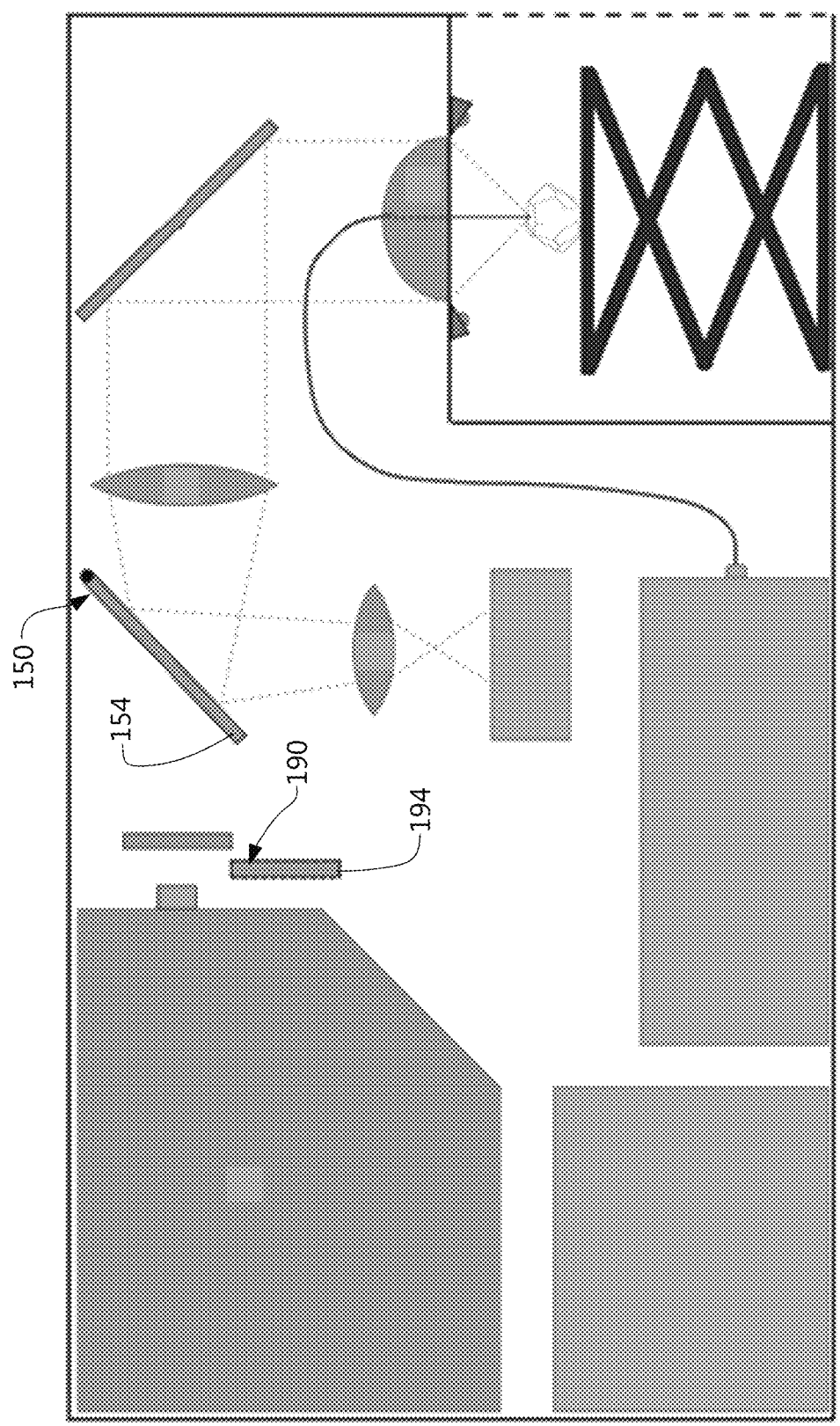
FIG. 4 is a diagram of the Raman Spectroscopy system of FIG. 3 with several movable components in their respective second positions.

In some embodiments, the Raman system 100 includes an assembly of additional optics and a video array detector for video image observation and aiming. Preferably, this assembly includes an observation redirection mirror 150, an observation image-formation lens 160, and a video optical image detector 170. Observation redirection mirror 150 has a first position 152 in which it is out of the way of the optical path of the signal light 115, as seen in FIG. 3. Observation redirection mirror 150 also has a second position 154 in which it is in the optical path of the visible light reflected from the sample 114 such that the visible light is reflected through observation image-formation lens 160 into video optical image detector 170, as seen in FIG. 4. The observation redirection mirror 150 can be under manual or motor control. Video imaging of the visible light permits confirmation of the analysis site without risk to a user's eyes. Preferably, a micro-switch will turn on the visible light source 118 when the observation redirection mirror 150 is in its second position 154, and the switch will turn off the visible light source 118 when the observation redirection mirror 150 is in its first position 152 for sample analysis.

In preferred embodiments, the Raman system 100 also includes a laser-line blocking filter 180 between the light-collecting optics and the spectrograph 210. In some embodiments, the blocking filter 180 is a notch filter or a knife-edge long pass filter. A different type of blocking filter is sufficient, providing it is capable of filtering out the intense (elastically scattered) laser light while passing the signal light 115 at Raman shifts as low as 150 or, ideally, 100 wavenumbers to the spectrograph 210 for observation.

Preferably, the Raman system 100 also includes a short-pass filter 190 designed to exclude from the spectrograph 210 all light having wavelengths longer than the laser wavelength (in wavenumbers)+1400 wavenumbers. While the laser source wavelength is chosen to avoid exciting fluorescence in the wavelength range being inspected by the Raman system, it may, in many cases, excite strong fluorescence in a longer wavelength portion of the spectrum. Although spectrographs are designed to absorb light wavelengths that are not deflected towards the detector by the grating, when this grating-excluded light includes intense fluorescent light a significant portion of it can defy absorption and get bounced towards the detector. In preferred embodiments the short-pass filter 190 is movable because short-pass filters always reduce even the desired light wavelengths to some degree and the minerals having the weakest Raman signal are rarely significantly fluorescent. Thus, short-pass filter 190 has a first position 192 in which it filters the signal light 115 before the spectrograph 210, and a second position 194 in which it does not filter the signal light 115. The short-pass filter 190 is movable either manually by the user or automatically by a control instrument 220.

Preferably, the optical path between the sample 114 and the spectrograph 210 is optimized for maximum light throughput to enable the Raman system 100 to work successfully with minerals that are weak Raman scatterers. The spectrograph 210 preferably includes a narrow slit 200 to improve spectral resolution achieved by the spectrograph 210, however, this type of entrance slit also excludes a large proportion of the scattered light from the sample. In preferred embodiments, the spectrograph slit 200 is a high throughput/high resolution technology such as HTVS (www.tornado-spectral.com).

Preferably, the spectrograph 210 itself is optimized for high throughput and sensitivity and for detection of signal light for a Raman-shift range from 100 to 1400 wavenumbers. Additionally, there is particular reason, for PMRI, to configure the spectrograph slit 200 to gather data from the 100 to 1400 wavenumber Raman-shift range without moving/scanning the grating. In some embodiments, options for a selectable increase to this range (e.g., through grating scan or second grating) are provided for mineralogical research that requires data from Raman lines at greater Raman shifts.

In preferred embodiments, the Raman system 100 includes electronic and/or optical components designed to manage laser damage to the sample 114. This can be accomplished through any means known in the art. For example, in some embodiments, this is accomplished by reducing the intensity of the laser beam 113 by controlling the laser device 110 itself and/or placing neutral-density filters between the laser device 110 and the sample 114. In other embodiments this is accomplished by employing one or more optical and/or electro-mechanical components between the laser device 110 and the sample 114 to broaden (defocus) the laser beam 113 on the sample 114, or to continuously move (raster) the laser beam 113 in a pattern over an area of the sample 114 that is significantly larger than the diameter of the laser beam 113.

Preferably, the Raman system 100 also includes a control instrument 220 configured to control the Raman system 100 and manage the data collection process. In preferred embodiments, the control instrument 220 is configured to control the intensity of laser beam 113; control any motor-controlled components, such as observation redirection mirror 150 and short-pass filter 190; and collect data, such as spectrograph data from the spectrograph 210 and video data from the video optical image detector 170. In some embodiments, control instrument 220 also communicates the collected data through a wired or wireless connection to an external computer capable of executing the software discussed below. In other embodiments, control instrument 220 is a computer capable of executing the software discussed below.

In some embodiments, the Raman system 100 is a portable unit and also includes a DC power-input port for powering from an external AC/DC plug-in power supply or an external rechargeable battery pack.

In some embodiments, the Raman system 100 is configured to permit viewing of microscopic material samples. In such embodiments, the optics described above are microscope optics that preferably provide maximum transparency for light in the 400-450 nm wavelengths. In preferred embodiments, the laser beam 113 is delivered to the sample 114 through coaxial laser insertion optics, such as a 70/30 partially reflecting mirror. In other embodiments, the optics described above are polarized light microscopy optics with both transmitted light and reflected light illumination. Preferably, embodiments of the Raman system configured for microscopic viewing include a confocal aperture to improve vertical resolution within the sample and enable an important PRMI application—the analysis of minerals in thin section under a coverslip.

The external computer/control instrument 220 will preferably have at least one processor configured to execute data-collection software, spectrum processing and mineral identification software, and noise-reduction software. The data-collection software is preferably equipped to work intelligently with minerals that produce very weak Raman signals, with a very wide range of Raman signal strengths, and with minerals prone to damage by the laser beam. In preferred embodiments, this is accomplished as follows:

First, like any other instrument control computer system, the PRMI data collection computer is preferably equipped with the communications interface and command set to control and or accept data from all addressable components such as laser power, laser shutter, motor controlled optical components, video imaging, and spectrograph components including detector.

Second, to avoid collecting detector background or blank spectra every time the exposure time is changed, all intensities will preferably be converted to counts per second.

Third, before beginning data collection on unknown materials, the user will preferably be prompted to remove any sample and lower the stage (or whatever sample holding platform is in use) for collection of a blank spectrum that the software will collect with the laser on. Although the exposure time for the blank will be user-adjustable, the default is preferably a long exposure (e.g., 300 to 600 seconds) so that the result characterizes the features of the optics and the detector rather than just electronic noise. While the counts-per-second standard allows for application of such a blank to a variety of exposure times on samples, changes to laser power or to any user configurable element of instrument optics preferably triggers the software to prompt for a new blank. A user-configurable "blank lifetime" will tell the software how often to prompt for a new blank to account for minor instrument drift over time.

Fourth, data collection will preferably proceed with an auto-exposure algorithm in which the software loops through collecting spectra and quickly processing the spectra with peak detection, saturation detection, and RMS noise estimation routines. This data collection loop begins at an exposure time fairly unlikely to result in detector saturation (e.g., 1 second) and repeats at least once. If the desired S/N ratio set by the user is met, the loop will exit. If detector saturation is detected, the algorithm will drop the exposure time by 50% and repeat. If no peaks were detected, the loop will increase the exposure time by a factor of 10 for the next loop. If peaks were detected, the software will calculate the exposure time needed to achieve the S/N target and set that exposure time for the next spectrum collection. Throughout this process no data will be discarded (except any spectra where detector saturation was detected)—the total detector counts in each channel will be accumulated as well as the total exposure time so that, when the loop exits, the accumulated spectrum can be converted to the counts per second standard. Preferably, the user controls this data-collection process by setting both a S/N target and a maximum total exposure time.

Fifth, since the minerals with the weakest Raman signals tend to be dark and/or metallic, the auto-exposure routine has, in some embodiments, a one-click "Dark Mineral" option that begins at a higher exposure time (e.g., 20 seconds).

Sixth, one of the reasons the auto-exposure routine preferably repeats at least once is to enable laser-damage detection. One of the indicators of specimen damage by the laser is that S/N of repeated exposures steadily decrease. In preferred embodiments, the auto-exposure routine alerts the user if specimen damage is detected.

Finally, the blank spectrum is preferably subtracted from all sample spectra collected to determine the true sample spectra.

The spectrum processing and mineral identification software preferably includes algorithms to perform (1) removal of both CRE peaks and continuum background; (2) normalization and square-root squashing; (3) spectrum identification-scoring against a database of reference spectra using an algorithm that both emphasizes coincidence of peaks and penalizes for missing peaks; and (4) sorting of the identification scores providing the user with a list of the top matches, which is preferably organized in descending order from best match downwards.

The primary objective of spectrum processing for a PRMI system is mineral identification. In light of the variability of relative peak intensity in the Raman spectra of minerals, there is a need, when comparing the "unknown" spectrum to reference spectra, to place highest priority on clearly identifying cases where both spectra have peaks in the same places and both spectra are devoid of peaks in the same places, and to place lower priority on measuring whether there is similarity in the pattern of relative peak height.

In the following description of spectrum match-scoring systems the two spectra being compared are A and B where each consists of a sequence of number pairs (Raman-shift, intensity) and where each contains intensity values for the same sequence of Raman-shift values. Based on this context $a_i$ and $b_i$ are the intensities of each spectrum at the $i^{th}$ value of Raman shift. The sums indicate summation over all values of i and computer-language syntax is used to express the equations used.

One popular match-scoring method is the well-established cosine similarity formula which consists of:

$$\text{Match}=\text{sum}(a_i*b_i)/(\text{sqrt}(\text{sum}(a_i\hat{\,}2)*\text{sqrt}(\text{sum}(b_i\hat{\,}2))$$

However, the drawback of the cosine-similarity formula is that it adds a significant positive contribution to the total identification score when one of the compared spectra has a strong peak and the second spectra has no peak at all in the same region. When judging whether the two spectra are from the same substance/phase such a missing peak should constitute a vote against the match not vote for it.

The present invention offers an improved match-scoring system, which will be referred to as an identification-scoring system containing two terms: the coincident peak term and the missing peak penalty term.

The coincident peak term corresponds to the entirety of traditional match-scoring formulae, however one worthwhile example would be simply:

$$(a_i+b_i)/2$$

This term will always be positive when both spectra have a peak in the same region, but will have the highest value when both peaks have similar intensities.

One worthwhile example of a missing-peak penalty term would be:

$$-V*\text{abs}(a_i-b_i)*(1-\min(a_i,b_i))\hat{\,}U$$

where V is an adjustable parameter controlling the overall magnitude of the penalty term. While it is important to subtract from (penalize) the identification score in the missing peak scenario, it is also important for this penalty to quickly disappear in cases where the lower intensity spectrum has even a weak peak in the same region. Here, U is an adjustable parameter controlling how fast the penalty term disappears.

The full identification-score formula is then:

$$\text{IDscore}=\text{sum}((a_i+b_i)/2-V*\text{abs}(a_i-b_i)*(1-\min(a_i,b_i))\hat{\,}U)$$

Figure 6:
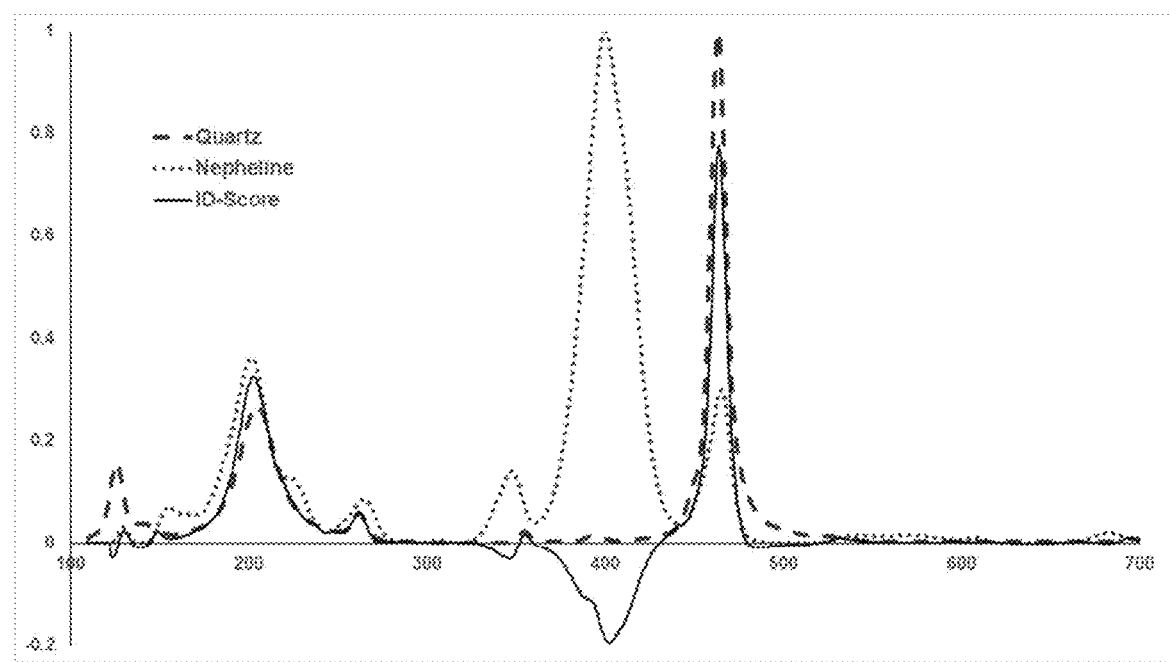
FIG. 6 is a graph displaying the behavior of the Identification Score formula of the present invention when used to compare the Raman spectra of Nepheline and Quartz.

FIG. 6 is a chart showing the behavior of the identification-score formula when comparing the Raman spectra of Nepheline and Quartz.

Preferably, the PRMI optimized spectrum processing software consists of the following:

First, the input spectrum to be matched/identified is prepared for matching as follows.

While basic pre-processing to remove CRE and continuum background is commonly performed by the spectrometer-data-collection software, the option to perform these pre-processing steps here is preferably available.

The data is reset to a standard range and spacing of Raman-shift values, e.g., whole integer wavenumber values covering the range of the spectrometer (i.e., 100 to 1400 wavenumbers).

The reset spectrum is normalized to its highest intensity value and then every (normalized) intensity is replaced by its square root.

Second, the algorithm loops through comparing the prepared intensity array to every spectrum in a reference database by calculating an identification-score using the formula specified above.

Third, the identification scores are sorted and a list of the reference spectra (by phase name) is presented to the user sorted with the highest scoring first.

A display or output of one or more of: (a) a name and/or chemical composition of one or more identified minerals; (b) the true Raman spectrum data; and (c) the one or more reference spectrums; are provided.

A prerequisite to practical use of the software is accumulation of a database of reference spectra and preparing them with identical background removal, spectrum resetting, normalization, and square-root squashing.

Some embodiments of the invention also include use of a software system for removing noise from reference spectra. Preferably, the noise-removal software is applied to the reference spectra before application of the previously described spectrum processing and identification software. Traditionally, many methods have been employed for noise reduction in spectrometry from a simple moving average to complex multi-step filtering algorithms. Their limitations include (1) they are ultimately noise reduction systems and not noise removal systems, and (2) they do not recognize the inherent regular shape of sample-signal peaks like Raman peaks. The answer to this limitation is to model the spectra instead of filtering them. While available software programs can be used to fit mathematical peak models to the spectral data, considerable methodology is employed in order to automatically model spectra having any number of peaks and a wide variety of S/N characteristics. Accordingly, the peak-modeling software employed must be programmable via some scripting language. Preferably, the methodology involves the following:

First, the input spectra must have already gone through CRE removal and continuum background removal pre-processing, as described above.

Second, noise outliers are preferably removed. Noisy spectra have been found to contain occasional single-channel noise outliers that interfere with the success of the spectrum modeling. Preferably, a five-point moving average smoothing performs this function. While this procedure tends to slightly broaden and reduce the relative intensity of some of the exceptionally sharp and narrow primary peaks of minerals like carbonates and sulfates, it actually improves pattern-match success for these minerals by reducing sensitivity to spectrometer calibration.

Third, each spectra is normalized to its strongest peak (highest intensity value).

Fourth, since discrimination needs to be made between discernable spectroscopic peaks and high points in the noise, an estimate of the root mean square ("RMS") noise of the spectrum must be calculated. An example of how to accomplish this before the position of spectral peaks has been established is to (a) fit a series of spaced data points (e.g. every 5th data point) to a spline curve over a sub-region of the spectrum, and (b) calculate the RMS of the residuals between all of the spectral data points over the same sub-region and this spline curve.

Figure 7A:
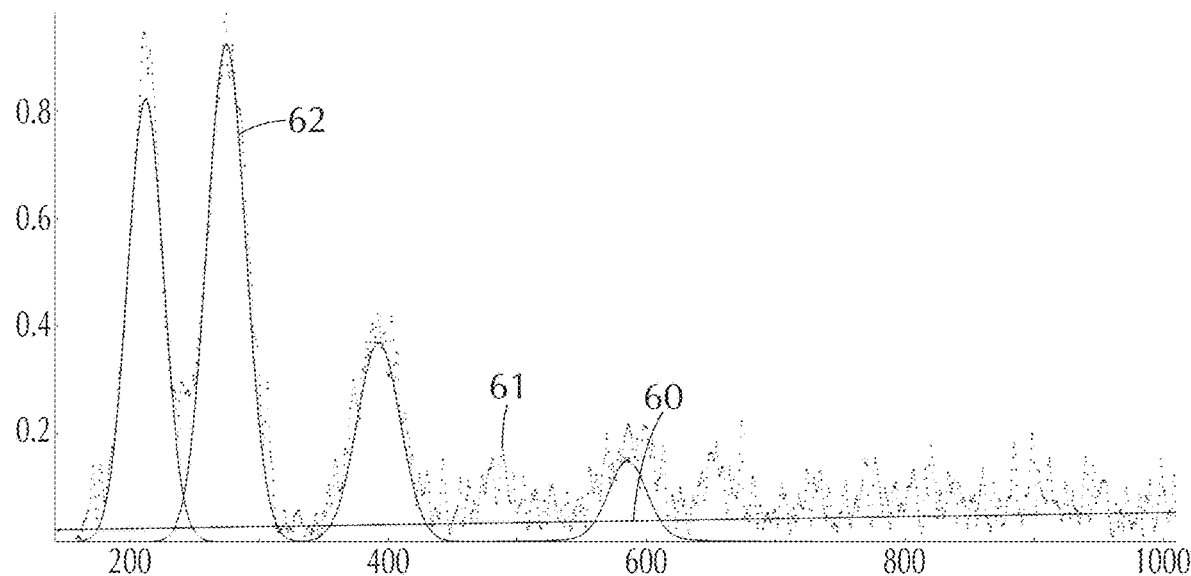
FIG. 7a is a graph showing original instrumental data and the individual modeling functions that constitute the model of the Raman spectrum before applying the noise-reduction software of the present invention.

Fifth, the first "curve" to be added to the model is a straight line 60, as depicted in FIG. 7a. This is necessary for baseline adjustment. While the true baseline of an instrumental spectrum would have an intensity of zero and instrumental noise would scatter on either side of zero, most continuum background removal algorithms leave all data points greater than zero—displaced from a true baseline.

Sixth, an iterative loop is entered that repeatedly performs the following functions: (a) identifies a potential peak position, (b) creates a new model peak at this position, (c) fits the entire accumulated spectrum model to the spectrum data by adjusting all peak size/shape parameters, (d) calculates the intensity residuals between the new model and each data point, (e) identifies the next potential peak position, and (f) compares the estimated height of this next-peak to a minimum peak-size limit based on the RMS noise level of the spectrum. When the potential next-peak has an estimated height smaller than this limit, the iterative loop is exited. FIG. 7a also shows the starting spectrum data 61, as well as the modelled peaks 62.

Since most peak-finding algorithms have trouble resolving significantly overlapping peaks, which is a very common feature of Raman spectra, an effective method for identifying the next potential peak is to preferably calculate the spectral position of the maximum value of the model-data residuals.

Since Raman peaks are known to have shapes that are a combination of Gaussian and Lorentzian shapes, it is preferred that each peak added uses a peak-shape formula that variably combines these two, such as the Pseudo-Voigt formula.

It is preferred that the peak size/shape parameters be constrained to within a range of realistic values. For example, parameters like full width at half maximum ("FWHM") should not be allowed to have negative values.

The minimum peak-size limit that is used to control when the iterative loop is exited is based on the need to distinguish the smallest peak that is likely to represent spectroscopic data from a random high in the instrumental noise. Through testing on a variety of example spectra, the inventor found that the minimum-peak-size limit preferably needs to be about three times the RMS noise.

The spectrum model being created and refined via the iterative loop is capable, if not likely, to become a more accurate model of the spectrum than the spline-curve method employed for the initial RMS noise estimation. Accordingly, each time a new model is created and fitted in the iterative loop, the root-mean-square of the model residuals is preferably compared to the initial RMS estimate and, if found to be lower, adopted as the new RMS noise estimate.

Seventh, the initial straight-line function is preferably subtracted from the model to bring its baseline down to zero.

Eighth, having a mathematical model for the spectrum, the modeled version of the spectrum is preferably output as a series of data points (Raman-shift, intensity) calculated using the model. In some embodiments, this is done using a specific desired data spacing (e.g., whole wavenumber values) and a specific range of Raman-shift values. Both the modeled spectrum and a square-root squashed version of the model can be output at the same time.

In many cases this procedure produces one or more small "peaks" whose role in the model is to fill in where the Pseudo-Voigt shape does not adequately describe the real Raman peaks. While these small shape-filling peaks do not themselves represent real Raman "modes" of the material the spectrum was collected from, they do not detract from the validity of the spectrum model created by this method.

Figure 7B:
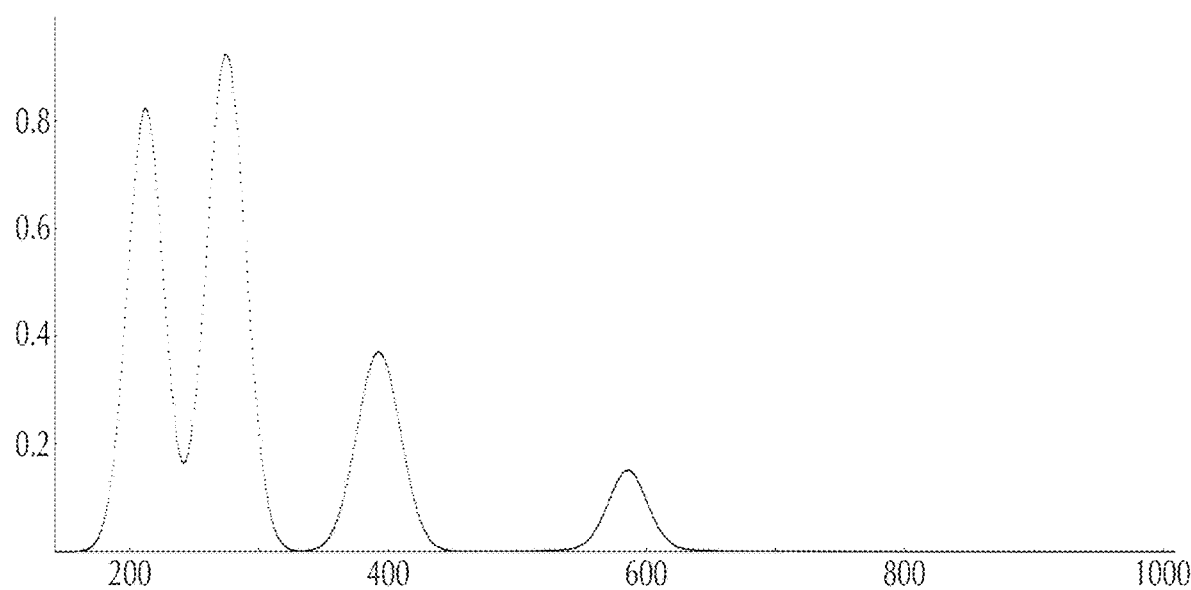

The resulting modeled spectrum is a smoothly varying curve with no random intensity variations, as seen in FIG. 7b. Although this procedure is too computationally slow for real-time data processing, it can be applied once, in advance, to all of the reference spectra before deploying the reference-spectra database. The resulting noise-free reference database improves the performance of spectrum-match (species identification) software, particularly when the instrumental spectrum of the unknown is significantly noisy (i.e., has moderate to low S/N).

In one embodiment of the method of identifying minerals, the steps of the method provide for illuminating a sample holder area having no sample therein for a blank illumination duration with monochromatic light having a wavelength; collecting a blank scattered light resulting from the blank illumination duration using at least one Raman spectrometer detector; executing software in a digital computer to determine a blank spectrum data corresponding to the blank scattered light dividing all spectrometer intensities by the exposure duration time to record all intensities as counts per second; illuminating a mineral sample in the sample holder area for a first illumination duration with the same monochromatic light and collecting a first scattered light resulting from the first illumination duration using the at least one Raman spectrometer detector; executing software in a digital computer to determine a first Raman spectrum data corresponding to the first scattered light dividing all spectrometer intensities by the exposure duration time to record all intensities as counts per second; and executing software in a digital computer to determine a true Raman spectrum data determined by a difference between the first Raman spectrum data and the blank spectrum data. Desirably, the method includes additional steps of illuminating the mineral sample for a second or more illumination duration(s) with the same monochromatic light and collecting second or more scattered light resulting from the second illumination duration(s) using the at least one Raman spectrometer detector; executing software in a digital computer to determine second or more Raman spectrum data corresponding to the second or more scattered light dividing all spectrometer intensities by the exposure duration time to record all intensities as counts per second; executing software in a digital computer to determine an aggregated or average Raman spectrum data corresponding to the first scattered light and the second or more scattered light; and executing software in a digital computer to determine the true Raman spectrum data determined by a difference between the aggregated or average Raman spectrum data and the blank spectrum data. Preferably, the monochromatic light has a wavelength in the range of about 400 nm to about 425 nm. Preferably the Raman spectrometer detector is adapted to detect a Raman-shift range of about 100 $cm^{-1}$ to about 1400 $cm^{-1}$.

The true Raman spectrum data is compared to one or more reference spectrums to determine if the true Raman spectrum data corresponds to one or more reference spectrums by a software process executed on a digital computer. Preferably, the reference spectrums comprise mathematical models of Raman spectrums of different minerals and/or noise-free reference spectrum data sets generated by mathematical models of Raman spectrums of minerals.

One or more of: (a) a name and/or chemical composition of one or more minerals identified by the one or more reference spectrums corresponding to the true Raman spectrum data; (b) the true Raman spectrum data; and (c) the one or more reference spectrums corresponding to the true Raman spectrum data are output by display on a screen, printout, and/or saving to a data file when reference spectrum(s) corresponding to the true Raman spectrum data are identified.

The determination of whether the one or more reference spectrums corresponding to the true Raman spectrum data is preferably provided by calculating an identification score for each reference spectrum relative to the true Raman spectrum data using a formula that includes both a coincident-peak term and a missing-peak-penalty term. In one embodiment, the identification score is determined by the formula: IDscore=sum($(a_i+b_i)/2-V*abs(a_i-b_i)*(1-min(a_i,b_i)))\hat{\ }U$), wherein $a_i$ and $b_i$ are the intensities of the true first spectrum data and the reference spectrum, respectively, at the $i^{th}$ value of Raman shift, and V and U are user-selectable parameters.

The calculated identification scores can be sorted in descending order; and an output may be presented that includes one or more of: (a) a name and/or chemical composition of one or more minerals identified by one or more reference spectrums corresponding to the true Raman spectrum data; (b) the true Raman spectrum data; (c) the one or more reference spectrums corresponding to the true Raman spectrum data; and (d) the calculated identification score of the one or more reference spectrums corresponding to the true Raman spectrum data.

The method desirably also provides that if collected spectrum data indicates saturation of a detector used to receive the scattered light, then that spectrum data is not used in calculating the true Raman spectrum data, and preferably, the method automatically runs an additional test cycle where the time period of the additional illumination duration is less than the illumination durations that caused saturation in the detector.

Similarly, if a minimum if a signal-to-noise ratio minimum is not met and the Raman spectrum data does not indicate the presence of at least one peak, then the method automatically runs an additional test cycle where the time period of the additional illumination duration is greater than the illumination durations of the prior test cycles.

Although the invention has been described with reference to a particular arrangement of parts, features, and the like, these are not intended to exhaust all possible arrangements or features. Indeed, many other modifications and variations will be ascertainable to those of skill in the art.

What is claimed is:

1. A computer readable medium, accessible by at least one processor, the medium comprising software instructions executable by the at least one processor for:
   receiving into a computer memory a true Raman spectrum data of an unknown material;
   comparing the true Raman spectrum data to one or more reference Raman spectra via the following steps:
   calculating an identification score for each reference Raman spectrum relative to the unknown material true Raman spectrum data using a formula that includes both a coincident-peak term and a missing-peak-penalty term;
   sorting the calculated identification scores in descending order; and
   outputting information regarding materials identified according to the identification score.

2. The computer readable medium of claim 1, wherein the identification-score is determined using the formula $$IDscore=sum((a_i+b_i)/2-V*abs(a_i-b_i)*(1-min(a_i,b_i)))\hat{\ }U)$$

wherein $$sum((a_i+b_i)/2$$

is the coincident-peak term and $$-V*abs(a_i-b_i)*(1-min(a_i,b_i)))\hat{\ }U)$$

is the missing-peak-penalty term and $a_i$ and $b_i$ are the normalized intensities of the unknown Raman spectrum data and the reference Raman spectrum, respectively, at the $i^{th}$ value of Raman shift, and V and U are user-selectable parameters.

3. The computer readable medium of claim 1, wherein one or more of the reference Raman spectra is a noise-free reference Raman spectrum determined by a mathematical model of a known mineral Raman spectrum.

4. The computer readable medium of claim 3, wherein each noise-free reference Raman spectra has been determined by:
   calculating an estimate of the RMS noise of the Raman spectrum data;
   fitting a linear mathematical model to the spectrum data;
   then, in an iterative loop, adding a pseudo-Voigt curve to the model centered at the maximum of the model-data residual, fitting the new model to the spectrum data, and comparing the height of the new residual maximum to the RMS noise;
   exiting the iterative loop only when the new residual maximum is less than n times the RMS noise where n has a value chosen by the user.

5. The computer readable medium of claim 1, where the unknown material is a mineral or a crystalline solid.

6. The method of claim 5, wherein the true Raman spectrum data of the unknown material is acquired by illuminating the unknown material monochromatic light having a wavelength in the range of about 400 nm to about 425 nm.

7. A method for identifying a material, comprising:
   illuminating a sample holder area having no sample therein for a blank illumination duration with monochromatic light having a wavelength;
   collecting a blank scattered light resulting from the blank illumination duration using at least one Raman spectrometer detector;
   executing software in a digital computer to determine a blank spectrum data corresponding to the blank scattered light;
   illuminating a material sample in the sample holder area for a first illumination duration with monochromatic light having a wavelength which is the same as the wavelength of the monochromatic light used to illuminate the sample holder area having no sample therein for the blank illumination duration;
   collecting a first scattered light resulting from the first illumination duration using the at least one Raman spectrometer detector;
   executing software in a digital computer to determine a first Raman spectrum data corresponding to the first scattered light; and
   executing software in a digital computer to determine a material true Raman spectrum data determined by a difference between the first Raman spectrum data and the blank spectrum data with removal of CRE and continuum background;

comparing the material true Raman spectrum data to one or more reference Raman spectra via the following steps:

calculating an identification score for each reference Raman spectrum relative to the Raman spectrum data of the unknown material using a formula that includes both a coincident-peak term and a missing-peak-penalty term;

sorting the calculated identification scores in descending order; and outputting information regarding materials identified according to the identification score.

8. The method of claim 7, wherein the identification-score is determined using the formula $$IDscore = sum((a_i+b_i)/2 - V*abs(a_i-b_i)*(1-min(a_i,b_i))^U)$$

wherein $$sum((a_i+b_i)/2$$

is the coincident-peak term and $$-V*abs(a_i-b_i)*(1-min(a_i,b_i))^U$$

is the missing-peak-penalty term and $a_i$ and $b_i$ are the normalized intensities of the unknown Raman spectrum data and the reference Raman spectrum, respectively, at the $i^{th}$ value of Raman shift, and V and U are user-selectable parameters.

9. The method of claim 7, wherein one or more of the reference Raman spectra is a noise-free reference Raman spectra determined by a mathematical model of a known material Raman spectrum.

10. The method of claim 9, wherein each noise-free reference Raman spectra has been determined by:

calculating an estimate of the RMS noise of the Raman spectrum data;

fitting a linear mathematical model to the spectrum data;

then, in an iterative loop, adding a pseudo-Voigt curve to the model centered at the maximum of the model-data residual, fitting the new model to the spectrum data, and comparing the height of the new residual maximum to the RMS noise;

exiting the iterative loop only when the new residual maximum is less than n times the RMS noise where n has a value chosen by the user.

11. The method of claim 7, where the material is a mineral or a crystalline solid.

12. The method of claim 11, wherein the monochromatic light has a wavelength in the range of about 400 nm to about 425 nm.

13. The method of claim 7, wherein outputting information regarding materials identified according to the identification score comprises displaying or printing one or more of: (a) a name and/or chemical composition of one or more identified materials; (b) the true Raman spectrum of the unknown material; and (c) the one or more reference Raman spectra.

* * * * *